United States Patent
Ye

(10) Patent No.: US 8,089,246 B2
(45) Date of Patent: Jan. 3, 2012

(54) COMPUTER SYSTEM AND WIRELESS DEVICE HOLDER THEREOF

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 286 days.

(21) Appl. No.: 12/464,082

(22) Filed: May 11, 2009

(65) Prior Publication Data

US 2010/0259212 A1    Oct. 14, 2010

(30) Foreign Application Priority Data

Apr. 13, 2009    (CN) .......................... 2009 1 0301502

(51) Int. Cl.
  *H02J 7/00*    (2006.01)
  *H02J 7/14*    (2006.01)
(52) U.S. Cl. ........ 320/108; 320/113; 320/118; 320/123; 320/137; 345/156; 345/163
(58) Field of Classification Search .......... 320/105–137; 345/156–163
See application file for complete search history.

(56) References Cited

U.S. PATENT DOCUMENTS

| 6,476,795 B1 * | 11/2002 | Derocher et al. | 345/163 |
| 7,200,765 B2 * | 4/2007 | Skurdal et al. | 713/323 |
| 2002/0061739 A1 * | 5/2002 | Nakamura et al. | 455/343 |
| 2006/0202660 A1 * | 9/2006 | Chang | 320/115 |
| 2008/0136366 A1 * | 6/2008 | Lee | 320/103 |
| 2008/0180057 A1 * | 7/2008 | Watanabe | 320/103 |

FOREIGN PATENT DOCUMENTS

| CN | 2525684 Y | 12/2002 |
| CN | 2798172 Y | 7/2006 |

* cited by examiner

*Primary Examiner* — Huy Q Phan
*Assistant Examiner* — Emily Chan
(74) *Attorney, Agent, or Firm* — Altis Law Group, Inc.

(57) ABSTRACT

A computer system includes a wireless device to generate wireless signals, a computer comprising a chassis and a motherboard, and a wireless device holder positioned on the chassis to accommodate and recharge the wireless device. The wireless device includes a rechargeable battery cell and two charging terminals connected to the rechargeable battery cell. The wireless device holder includes a main body including a holder connector connected to the motherboard, to enable the wireless device holder to communicate with and to be powered by the motherboard, a recharging unit to recharge the rechargeable battery cell, and two charging contact members corresponding to the charging terminals and connected to the recharging unit. When the wireless device is placed in the wireless device holder, the charging contact members contact the charging terminals, and the recharging unit recharges the rechargeable battery cell with power supplied by the motherboard.

12 Claims, 3 Drawing Sheets

COMPUTER SYSTEM AND WIRELESS DEVICE HOLDER THEREOF

BACKGROUND

1. Technical Field

The present disclosure relates to computer systems, and particularly to a computer system with a wireless device and a wireless device holder.

2. Description of Related Art

Generally, a wireless mouse unit includes a wireless mouse to generate wireless signals and a receiver for receiving the wireless signals from the wireless mouse. The receiver is connected to and powered by a computer via an external cable, and configured for transmitting the received wireless signals to the computer to, for example, move a cursor across a display screen of the computer. However, the external cable is exposed, and can get dirty and twisted up with other cables. It is inconvenient to periodically clean and untangle the external cable.

Furthermore, the wireless mouse is powered by a built-in power source, such as a dry cell with limited capacity that needs to be replaced frequently. When the dry cell is depleted and if no spare dry cells are on hand, the wireless mouse cannot be used.

DETAILED DESCRIPTION

Figure 1:
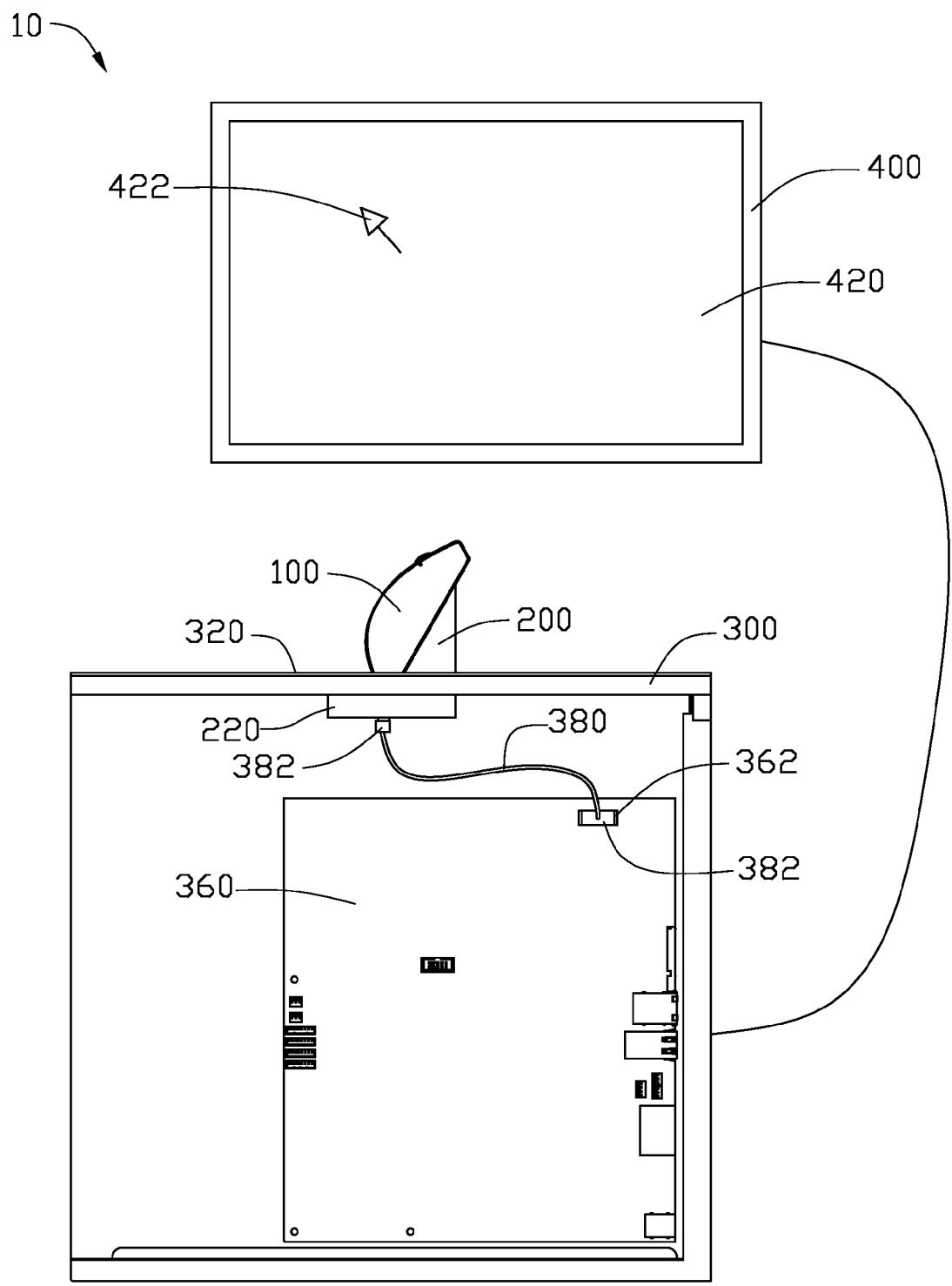
FIG. 1 is a perspective, schematic view of an embodiment of a computer system, the computer system including a wireless mouse and a wireless mouse holder.

Referring to FIG. 1, an exemplary embodiment of a computer system 10 includes a wireless device 100, a wireless device holder 200, a computer 300, and a monitor 400 connected to the computer 300. The wireless device 100 is to generate wireless signals. The wireless device holder 200 is to recharge the wireless device 100 and to receive the wireless signals. The computer 300 is to power the wireless device holder 200, and to perform corresponding tasks according to the wireless signals received from the wireless device holder 200. The wireless device 100 may be, but is not limited to, a wireless mouse, a wireless keyboard, a digital tablet, a digital pen etc. In the instant embodiment, the wireless device 100 is a wireless mouse, and the wireless device holder 200 is a wireless mouse holder accordingly.

Figure 2:
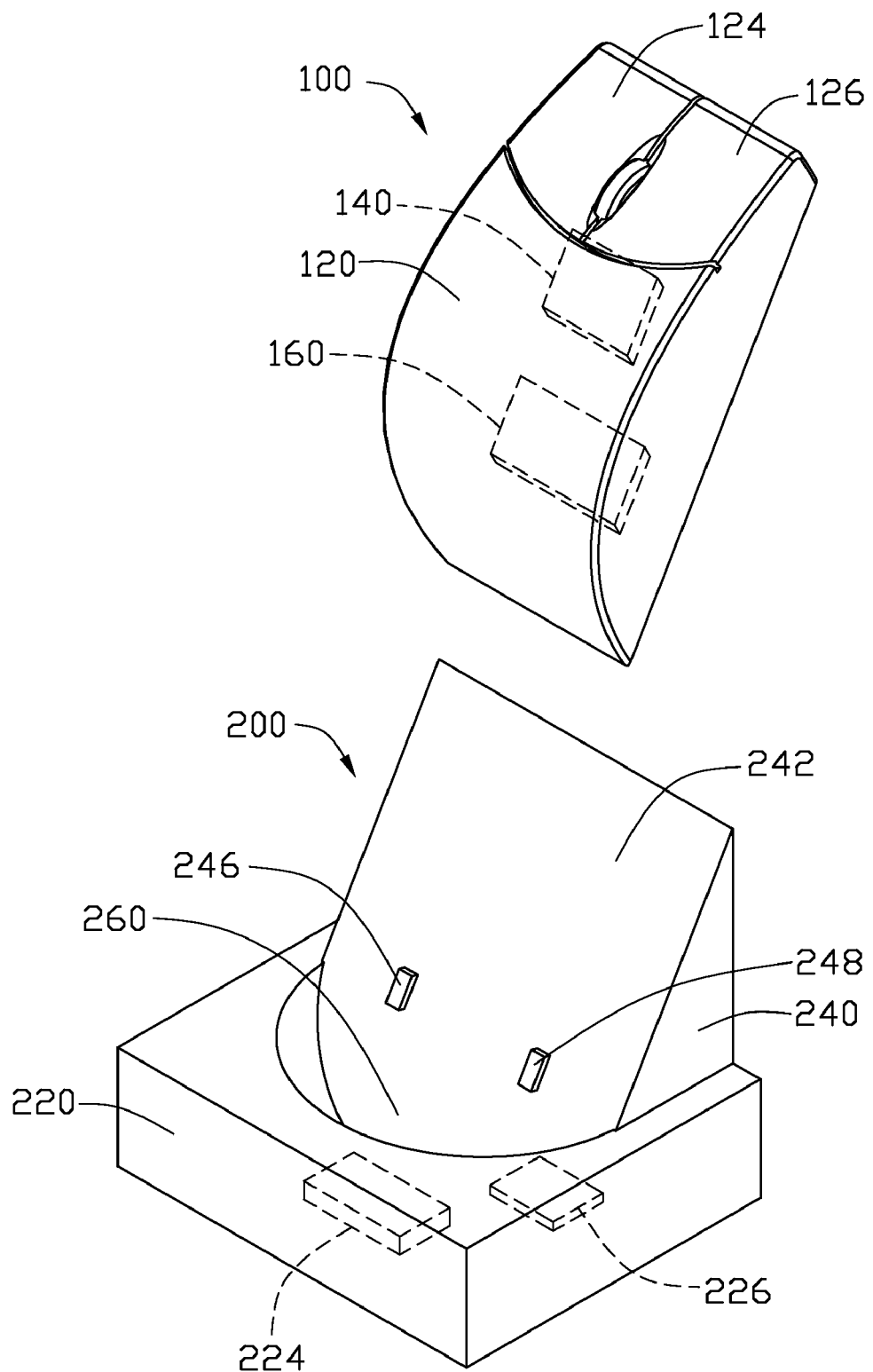
FIG. 2 is an exploded, isometric view of the wireless mouse and the wireless mouse holder of the computer system of FIG. 1.
Figure 3:
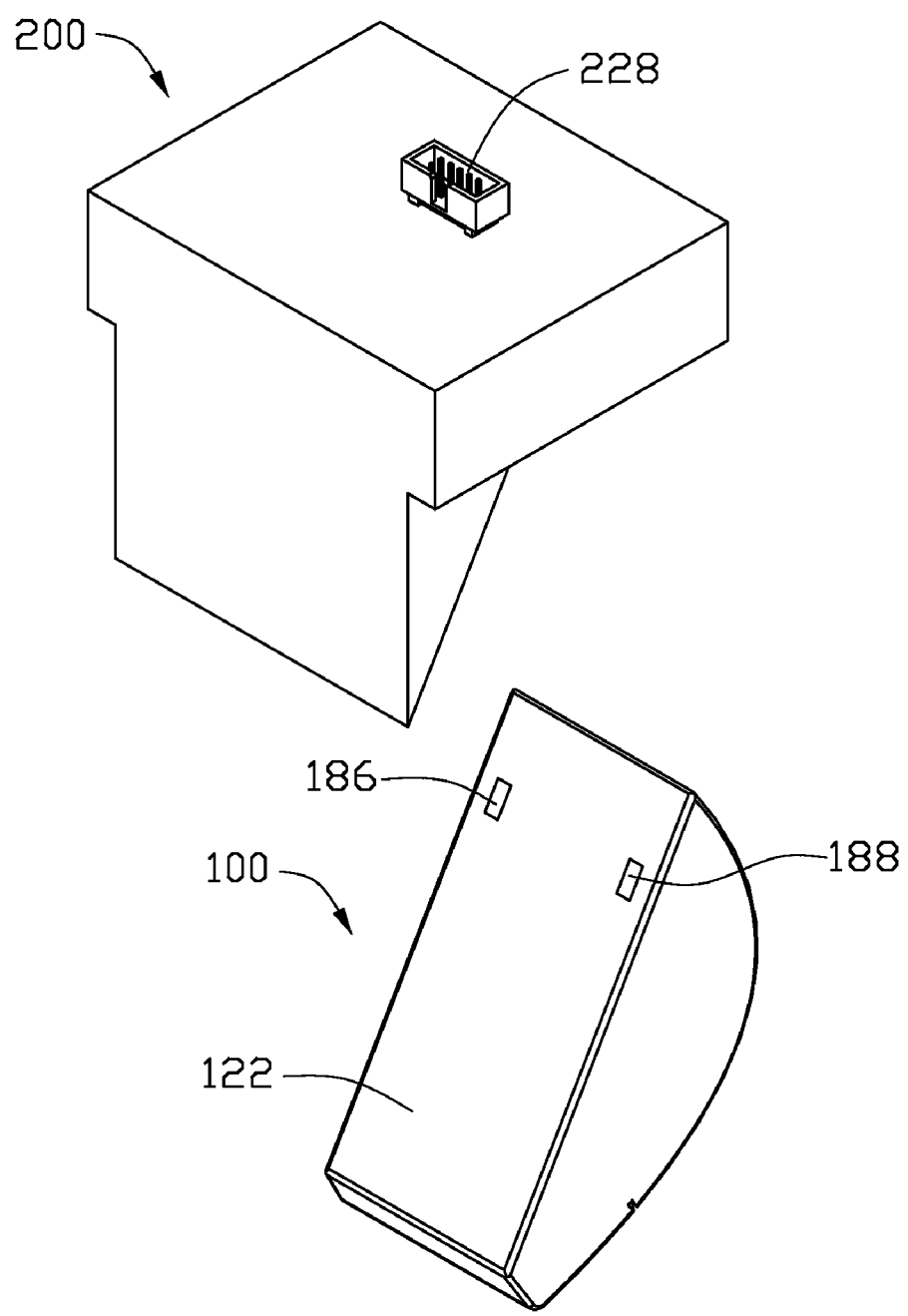
FIG. 3 is an inverted view of the wireless mouse and the wireless mouse holder of FIG. 2.

Referring to FIGS. 2 and 3, the wireless mouse 100 includes a shell 120, a signal transmission unit 140 to transmit the wireless signals generated by the wireless mouse 100, a rechargeable battery cell 160 to power the wireless mouse 100, and two charging terminals 186, 188 connected to an anode and a cathode of the rechargeable battery cell 160 respectively. Two buttons 124, 126 are located on a top of the shell 120 and adjacent to a front end of the shell 120. The signal transmission unit 140 and the rechargeable battery cell 160 are received in the shell 120. And the two charging terminals 186, 188 are located on a bottom 122 of the shell 120.

The wireless mouse holder 200 includes a main body 220 accommodating a signal receiving unit 224 and a recharging unit 226, and a support portion 240 extending from the main body 220 and including a support surface 242. The signal receiving unit 224 is to receive the wireless signals transmitted by the signal transmission unit 140. The recharging unit 226 recharges the rechargeable battery cell 160. A groove 260 is defined in the main body 220, approaching to the support surface 242, to accommodate the wireless mouse 100. A holder connector 228 is located on a bottom of the main body 220 and electrically connected to the recharging unit 226 and the signal receiving unit 224. Two charging contact members 246, 248 are positioned on the support surface 242, corresponding to the two charging terminals 186, 188, and connected to the recharging unit 226.

The computer 300 includes a chassis 320 and a motherboard 360 accommodated in the chassis 320. The wireless mouse holder 200 is positioned on the chassis 320, especially, the main body 220 is embedded in the computer 300. A motherboard connector 362 positioned on the motherboard 360 is detachably electrically connected to the holder connector 228 via a cable 380, to enable the wireless mouse holder 200 to be powered by the motherboard 360, and to enable the motherboard 360 to receive the wireless signals from the wireless mouse holder 200. The cable 380 includes two cable connectors 382 fixed on two ends of the cable 380 respectively, one cable connector 382 is to be connected to the holder connector 228, and the other cable connector 382 is to be connected to the motherboard connector 362. In one embodiment, each of the cable connectors 382 is a female universal serial bus (USB) connector having pinholes in a 2×5 array. The holder connector 228 and the motherboard connector 362 are each a male USB connector having 10 pins in a 2×5 array. Therefore, the holder connector 228 and the motherboard connector 362 can be inserted into the corresponding cable connectors 382 to connect the wireless mouse holder 200 to the motherboard 360.

In use, the signal transmission unit 140 transmits the wireless signals generated by the wireless mouse 100 by corresponding operations, such as, clicking the button 124 or 126 of the wireless mouse 100. The signal receiving unit 224 receives the wireless signals and transmits the wireless signals to the motherboard 360 via the cable 380. The motherboard 360 controls a cursor 422 on a display screen 420 of the monitor 400, to select various options or to move across the display screen 420, according the wireless signals received from the signal receiving unit 224.

When the wireless mouse 100 is placed in the wireless mouse holder 200, the groove 260 accommodates the wireless mouse 100, the support portion 240 supports the wireless mouse 100, the support surface 242 contacts the bottom 122 of the wireless mouse 100, and the charging contact members 242, 246 contact the charging terminals 186, 188 accordingly. Therefore, the recharging unit 226 and the rechargeable battery cell 160 form a charging circuit, and the recharging unit 226 recharges the rechargeable battery cell 160 with power supplied by the motherboard 360.

The wireless mouse holder 200 can communicate with the motherboard 360 without an external cable. Therefore, there is no need to periodically clean and untangle the external cable. Moreover, when the wireless mouse 100 is set in the wireless mouse holder 200, the charging terminals 186, 188 contact the charging elastic members 242, 246, the rechargeable battery cell 160 built into the wireless mouse 100 can be charged by the recharging unit 226, therefore the wireless mouse 100 can be readied for use with an adequate charge.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer system, comprising:
   a wireless device to generate wireless signals, wherein the wireless device comprises:
      a rechargeable battery cell to power the wireless device; and
      two charging terminals connected to an anode and a cathode of the rechargeable battery cell respectively;
   a computer comprising a chassis, and a motherboard accommodated in the chassis and comprising a motherboard connector; and
   a wireless device holder disposed on a top portion of the chassis to accommodate and recharge the wireless device, wherein the wireless device holder comprises:
      a main body comprising a holder connector electrically connected to the motherboard connector, to enable the wireless device holder to receive the wireless signals to communicate with, and enable the wireless device holder to be powered by, the motherboard;
      a supporting portion extending from the main body and comprising a supporting surface;
      a groove defined in the main body and adjacent to the supporting surface to accommodate at least a portion of the wireless mouse;
      a recharging unit to charge the rechargeable battery cell; and
      two charging contact members connected to the recharging unit, to electrically connect the two charging terminals of the wireless device respectively;
      wherein the charging contact members contact the corresponding charging terminals, in response to the wireless device being placed on the wireless device holder, therefore the motherboard charges the rechargeable battery cell through the motherboard connector of the computer, the holder connector of the wireless device holder, and the recharging unit of the wireless device holder.

2. The computer system of claim 1, wherein the rechargeable battery cell is disposed in the wireless device, and the charging terminals are located on a bottom surface of the wireless device.

3. The computer system of claim 1, wherein the wireless device further comprises a signal transmission unit to transmit the wireless signals generated by the wireless device.

4. The computer system of claim 3, wherein the main body further comprises a signal receiving unit to receive the wireless signals from the signal transmission unit and to transmit the received wireless signals to the motherboard via the holder connector and the motherboard connector, the motherboard is to perform corresponding tasks according to the wireless signals received from the signal receiving unit.

5. The computer system of claim 1, wherein the wireless device is a wireless mouse, the wireless device holder is a wireless mouse holder.

6. The computer system of claim 1, wherein the computer further comprises a cable, the cable comprises two cable connectors fixed to two ends of the cable and connected to the holder connector and the motherboard connector respectively.

7. The computer system of claim 6, wherein the cable connectors are female connectors, and the holder connector and the motherboard connector are male connectors.

8. The computer system of claim 7, wherein each of the female connectors comprises 10 pinholes in a 2×5 array, each of the male connectors comprises 10 pins in a 2×5 array.

9. The computer system of claim 1, wherein the charging contact members of the wireless device holder are located on the supporting surface, the charging terminals of the wireless device are located on a bottom surface of the wireless device, such that the charging terminals electrically connect the charging contact members when the wireless device is settled on the wireless device holder.

10. A wireless mouse holder disposed on a top portion of a computer to accommodate and recharge a wireless mouse, comprising:
    a main body comprising:
       a holder connector to be connected to a motherboard accommodated in the computer, to enable the wireless mouse holder to communicate with, and to enable the wireless mouse holder to be powered by, the motherboard; and
       a recharging unit to recharge a rechargeable battery cell disposed the wireless mouse;
    a supporting portion extending from the main body and comprising a supporting surface;
    a groove defined in the main body and adjacent to the supporting surface to accommodate at least a portion of the wireless mouse; and
    two charging contact members disposed on the supporting surface and connected to the recharging unit.

11. The wireless mouse holder of claim 10, wherein the main body further comprises a signal receiving unit to receive wireless signals generated by the wireless mouse, and to transmit the received wireless signals to the motherboard.

12. The wireless mouse holder of claim 10, wherein the holder connector is a male connector.

* * * * *

UNITED STATES PATENT AND TRADEMARK OFFICE
CERTIFICATE OF CORRECTION

PATENT NO. : 8,089,246 B2
APPLICATION NO. : 12/464082
DATED : January 3, 2012
INVENTOR(S) : Ming-Ke Chen and Zhen-Xing Ye It is certified that error appears in the above-identified patent and that said Letters Patent is hereby corrected as shown below:

On the Title Page

Replace Item (75) regarding "Inventors" on the front page of the Patent with the following:

(75) Inventors: Ming-Ke Chen, Shenzhen (CN); Zhen-Xing Ye, Shenzhen (CN).

Signed and Sealed this
Twenty-second Day of May, 2012

David J. Kappos
*Director of the United States Patent and Trademark Office*